April 18, 1967  W. A. KIVELL  3,314,547
LIQUID CLARIFYING APPARATUS
Filed Nov. 16, 1964  3 Sheets-Sheet 1

INVENTOR.
WAYNE A. KIVELL
ATTORNEYS

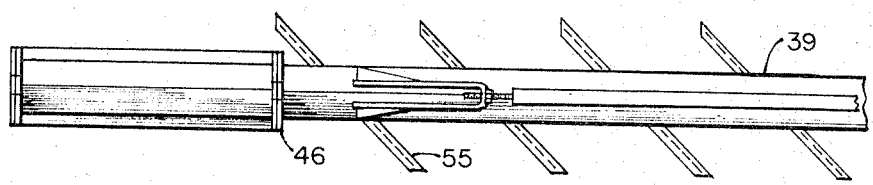
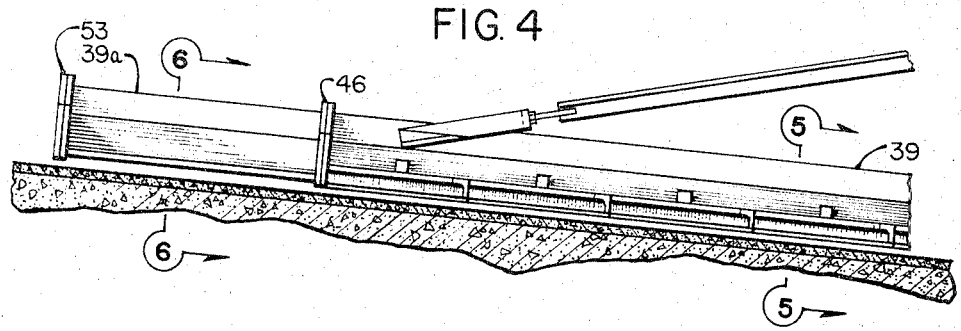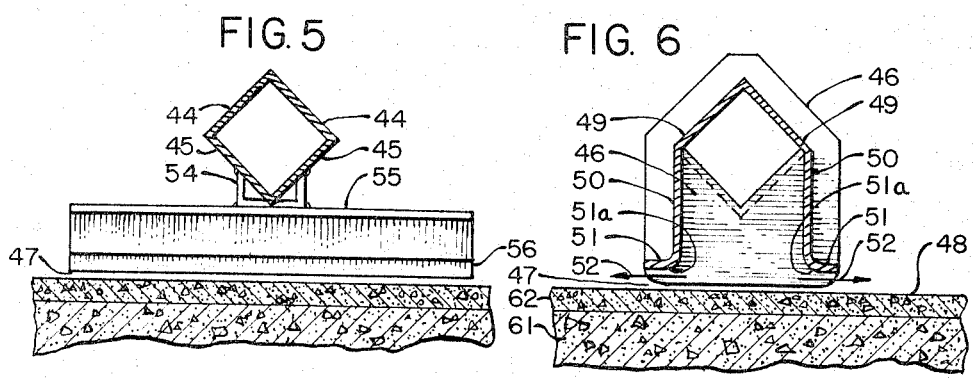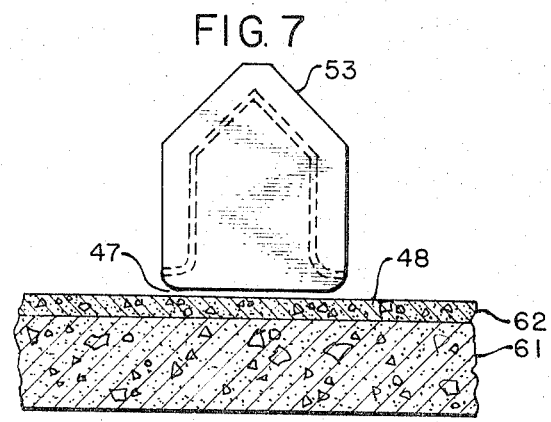

April 18, 1967  W. A. KIVELL  3,314,547
LIQUID CLARIFYING APPARATUS
Filed Nov. 16, 1964  3 Sheets-Sheet 3
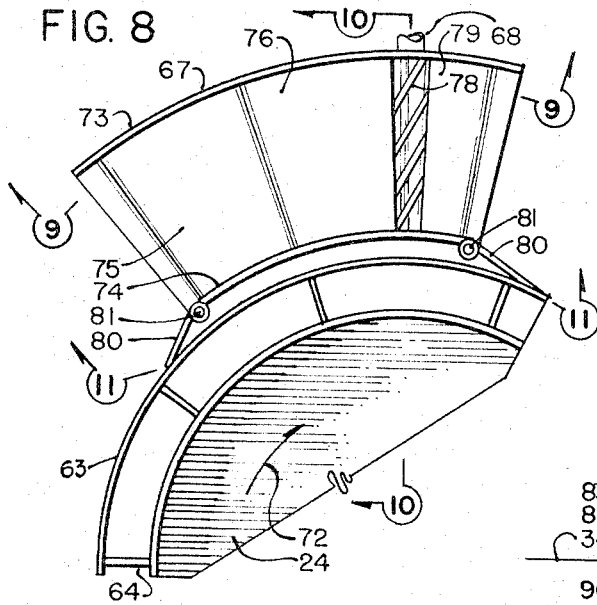
FIG. 8
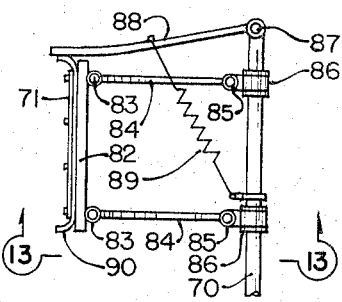
FIG. 12
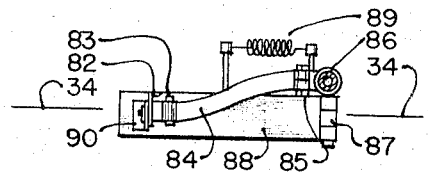
FIG. 13
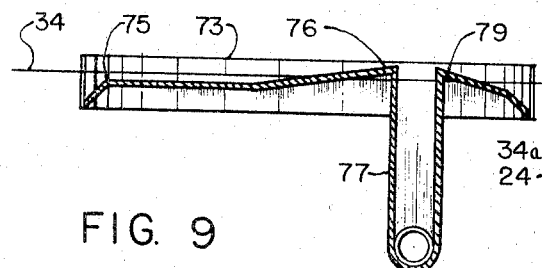
FIG. 9  FIG. 10
FIG. 14
FIG. 11
INVENTOR.
WAYNE A. KIVELL
BY
ATTORNEYS 3,314,547
LIQUID CLARIFYING APPARATUS
Wayne A. Kivell, 10 De Sablo Road,
San Mateo, Calif. 94402
Filed Nov. 16, 1964, Ser. No. 411,491
13 Claims. (Cl. 210—520)

This invention relates to improvements in apparatus of the type used for the clarification of turbid liquids such as sanitary sewage, industrial wastes and water carrying solids in suspension either in its raw state or during a treatment process where the clarification of a turbid liquid is a requisite of one or more steps in the treatment process.

A general or broad object of the present invention is to provide a new and novel apparatus for use in combination with complemental liquid holding tanks for the improvement of the clarification efficiency of sedimentation units. More particularly, it is an object of the invention to provide a new and improved combination means for distributing, collecting and removing settleable solids in the form of sludge and floatable solids in the form of scum by controlled hydraulic and mechanical means.

Conventional liquid clarifying units employing round tanks and rotating apparatus for the gravity separation and removal of settleable and floatable solids contained in the feed, include means for the collection and removal of sedimented solids in the form of sludge from the bottom of the tank and radial surface skimmers with peripherally located scum collection and discharge means for the collection and removal of floating solids in the form of scum from the liquid surface. Influent feed is introduced through a pipe line, or conduit, into an energy retaining feedwell located at the center of the tank while settled effluent is withdrawn over weirs or through submerged ports behind scum baffles from the proximate liquid surface adjoining the periphery of the tank. With such an arrangement, the flow main current is radially outward from the tank center and floatable solids rising to the liquid surface as free floating solids or collected as scum in front of the advancing side of a radial skimmer are transported by surface flow radially to the intercepting scum baffle where such solids and scum can be collected and discharged from the tank. Such a liquid clarifying unit as described above is generically classified in the art as of the centerfeed-peripheral overflow type. In practical application, experience has demonstrated that the arrangement and components as developed to produce most effective sedimentation are of poor assistance and in some cases incompatible with those required for effective collection and removal of scum. The main problems inherent in this type of unit and which my invention will overcome are discussed hereinafter.

Firstly, influent feed is introduced at a single point and contains hydraulic energy at discharge resulting from flow velocities, conventional for raw sewage as an example, on the order of about 0.75 to about 3.50 feet per second through the feed pipe. Discharge is in the form of a mushroom head flowing radially outward from apertures in a centrally located riser column connected at its base with the feed pipe placed as an inverted siphon underneath the tank floor. Surrounding the riser column is a concentric and bottomless feed well having an open surface area approximating 2 to 4 percent of the area of the tank and constructed with a solid vertical wall extending from above the liquid level to a depth below the liquid level sufficient to contain the turbulent flow for mixing, partial dissipation of the contained energy, directing the flow downward and preventing direct radial passage through the upper settling zone that would result in short circuiting of the influent feed to the effluent overflow means.

To relieve the inside of the feedwell of floating scum, one or more small openings are made in the surrounding wall at the liquid surface to permit scum to flow to the outside. Matching baffle plates somewhat larger than the openings are placed on the outside of the well to intercept the flow and prevent direct short circuiting of the influent feed to the effluent overflow means. Furthermore, because the influent feed directed downwardly from the feedwell is propelled by the hydraulic energies of the velocity head remaining in the flow and the static head of the super elevation of liquid level developed within the confining well, there exists the added impetus of the feed to target on the tank bottom and flow radially outward in the lower portion of the settling zone rather than adjacent the liquid surface.

Thus it is seen that even though the flow main current is radially outward from the tank center, all surface flow is effectively cut off at the feedwell and of no assistance to transport free floating solids and scum until a portion of flow main current reaches the liquid surface some indeterminate distance in front of the scum baffle.

Furthermore, for clarifying units treating liquids carrying solids which on introduction into the tank as influent feed will settle en masse and create density currents, there will be induced within conventional centerfeed-peripheral overflow arrangements a circulating current which on the liquid surface flows from tank periphery to center feedwell exactly the reverse of what is required to transport floating solids and scum to the peripherally located scum baffle. A typical example of such a flow pattern is found in the centerfeed-peripheral overflow units used as final clarifiers in the activated sludge process of sewage treatment. Mixed liquor, heavy laden with flocculant sludge solids, is drawn from the aeration tanks and discharged into feedwells as described above. The mixed liquor en masse, being of greater density than the fairly well clarified liquid overlaying the settled sludge blanket on the bottom of the tank, settles rapidly to the bottom and flows radially outward over the sludge blanket to target and rise against the containing tank wall. At the liquid surface, or at the plane of interference if an inwardly projecting effluent launder is used, the circulating current returns radially inward to join the influent feed below the feedwell and an induced pattern of recirculation is maintained. The flow pattern through such a unit is incompatible with that required for the effective collection and removal of scum. Confirmation of this flow pattern in the treatment of activated sludge is evidenced by the custom of those trained in the art to use concentric effluent launders spaced inboard from the tank wall to reduce the carry over to the effluent of suspended solids contained in the flow current rising against the tank wall.

From the foregoing description it is shown that the hydraulic flow pattern common to the centerfeed-peripheral overflow type of liquid clarifying unit cannot be employed in the apparatus required to efficiently collect and remove floatable solids and scum contained in all the kinds of liquids that may be presented for clarification. Accordingly, it is an object of my invention to utilize the flow pattern of peripheral bottom feed and central surface overflow following the teachings of my issued U.S. Patent No. 3,025,966 and to provide new and improved scum collection and removal apparatus to operate in combination with this hydraulic flow pattern to obtain efficient collection and removal of the floatable solids and scum contained in all the kinds of liquids that may be presented for clarification.

Secondly, radial surface skimmers collect free floating solids and scum in front of the advancing side of the skimming blades pushing it in concentric paths over the liquid surface within the sedimentation compartment of the tank but exert no force to move the collected scum radially from center feedwell to the intercepting peripheral scum baffle. Conventional skimming blades are vertical plates 6 to 8 inches deep extending 3 to 5 inches below the liquid level, and are supported on vertical brackets, attached to the radial sludge collecting arms. Such blades comprise a fixed blade extending the major portion of the radial distance from the feedwell to the scum baffle and a hinged outer section with an end scraper to scrape the face of the baffle, the skimmer serving to collect the scum accumulated in front of it and deliver the scum into a receiving box for discharge from the tank.

Since the skimmer is supported from the radial arms of the sludge collecting mechanism, the speed of the skimmer is determined by the rotating speed of the mechanism necessary to collect and discharge sludge from the tank at the rate of deposition and within the detention period of the liquid undergoing treament. The tip speed of radial sludge collecting arms is, however, restricted to that which will not agitate the liquid at the bottom of the tank sufficiently to throw settled solids into suspension and thereby increase the suspended solids contained in the effluent overflow. The hinged outer portion of a conventional scum skimmer operates at the same tip speed, not at the bottom of the tank with its conventional side water depth of 10 feet but at the liquid surface in front of a scum baffle having a conventional depth of 8 to 10 inches below the liquid level and positioned closely in front of the effluent overflow weirs, or ports. In this position, and moving at the tip speed of the arms, the skimming mechanism stirs up the surrounding liquid causing some of the suspended solids and scum to pass under the baffle and out with the effluent.

It is therefore another object of my invention to prevent loss of suspended solids and scum to the effluent by providing new and improved scum collection and removal apparatus positioned adjacent the center of the tank where travel speed of the scum collector and therefore agitation of the surface liquid will be a minimum as compared to conventional centerfeed-peripheral overflow units with their scum collection and removal apparatus positioned adjacent the periphery of the tank where travel speed of the scum collector and therefore agitation of the surface liquid is a maximum. In practical application, tip speed of the arms of conventional rotary clarifying apparatus is in the order of 10 feet per minute whereas, the travel speed of the scum collector constructed and operated according to my invention will be in the order of, but not restricted to, 1 to 2 feet per minute.

Thirdly, radial surface skimmers which collect free floating solids and scum in front of the advancing side of skimming blades and push it in concentric paths over the liquid surface and exert no force to move the collected scum radially from center feedwell to intercepting peripheral scum baffle, serve as bases for island formations of grease, oil and sticky solids such, for example, as those released from raw sewage. In function, the fixed portion of such surface skimmers serve no useful purpose except to accumulate scum as large islands adhering to the advancing side of the blades and they do create problems for the plant operator to get rid of the scum and clean the blades by other means, conventionally by water jets or hand spraying with pressure water from a hose. It is therefore another object of my invention to eliminate the operating problems caused by use of conventional radial fixed skimming blades and provide a new and improved combination hydraulic and mechanical scum collection and removal means that does not require such blades.

Fourthly, the flow pattern of centerfeed-peripheral overflow units precludes the use of economical and efficient apparatus for the collection and removal of scum. The scum baffle with its conventional vertical plate and closely spaced supporting wall brackets and wall anchors, must encircle the proximate inside face of the containing tank wall to trap floating scum and protect the overflow weirs, or ports discharging effluent to the peripherally located launder. The hinged outer portion of the rotating skimmer positioned at the liquid surface and in contact with the inboard face of the scum baffle, must be supported near the tip end of a radial sludge collecting arm. In this location, the hinged skimmer adds to the structural strength of the arm required to give it rigid support and to overcome torsional stresses that develop under abnormal operating conditions. In operation, the long intercepting scum baffle becomes coated with sticky material by contact and by the wiping action of the hinged skimmer, it thus presents a maximum of length to be cleaned and maintained by the plant operator. It is therefore a still further object of my invention to provide economical and efficient apparatus for the collection and removal of scum by utilizing the flow pattern of peripheral bottom feed-central surface overflow to position the scum intercepting baffle around the outside of a relatively small diameter, effluent overflow launder and to support the hinged scum skimmer from a radial, relatively short, cantilever bracket directly attached to the rotating center drum of the flow distributing means. In practical application, the length of scum baffle required with this arrangement will be in the order of, but not limited to, 15 to 20 percent of that required for the centerfeed-peripheral overflow type of liquid clarifying unit. The radial sludge collecting arm will be free and independent of apparatus required for the collection and removal of scum.

More specifically, my invention relates to improvements in apparatus of the type disclosed in my issued Patent No. 3,025,966 for Liquid Clarifying Apparatus wherein, in one embodiment, the preferred form of apparatus is equipped with a radial scum skimmer supported on an influent feed distributing arm and the liquid holding tank is equipped with a peripherally located effluent launder and scum retaining baffle of the types used with conventional centerfeed-peripheral overflow units for the collection and removal of scum.

Other objects and advantageous features of the invention will become apparent hereinafter, wherein the preferred form of apparatus for the collection and removal of floating solids in the form of scum is disclosed in combination with my preferred form of liquid clarifying apparatus for the sedimentation, collection and removal of settleable solids in the form of sludge. As illustrative of certain embodiments of apparatus in the fields to which the invention relates, reference is made to the accompanying drawings constituting a part of the specification.

In the drawings:

FIG. 1 is a partial top plan of the preferred form of apparatus and liquid holding tank with means for distributing the influent flow over a bottom feed area adjacent the periphery and a centrally located effluent launder with scum collection and removal means adjacent the top illustrating the improved combination feed, overflow and scum removal means of the present invention with portions of the structure broken away;

FIG. 3 is a plan view of the outer portion of an arm of the flow distributing apparatus, the same being on an enlarged scale;

FIG. 4 is a view in elevation of the rear or trailing side of the outer portion of an arm of the flow distributing apparatus, the same being on an enlarged scale;

FIG. 5 is a sectional view taken substantially on the line 5—5 of FIG. 4;

FIG. 6 is a sectional view taken substantially on the line 6—6 of FIG. 4;

FIG. 7 is a view looking at an end of an arm with a portion of the underlying floor being in section;

FIG. 8 is a partial top plan of the centrally located effluent launder with attached scum baffle and adjacent scum collection box, the same being on an enlarged scale;

FIG. 9 is a sectional view taken substantially on the line 9—9 of FIG. 8;

FIG. 10 is a sectional view taken substantially on the line 10—10 of FIG. 8;

FIG. 11 is a sectional view taken substantially on the line 11—11 of FIG. 8;

FIG. 12 is a top plan of the rotating scraper blade of the scum skimmer, the same being on an enlarged scale;

FIG. 13 is a sectional view taken substantially on line 13—13 of FIG. 12;

FIG. 14 is a transverse sectional view of the top portion of the centrally located riser column and its concentrically located effluent overflow launder with supporting drum.

Figure 1:
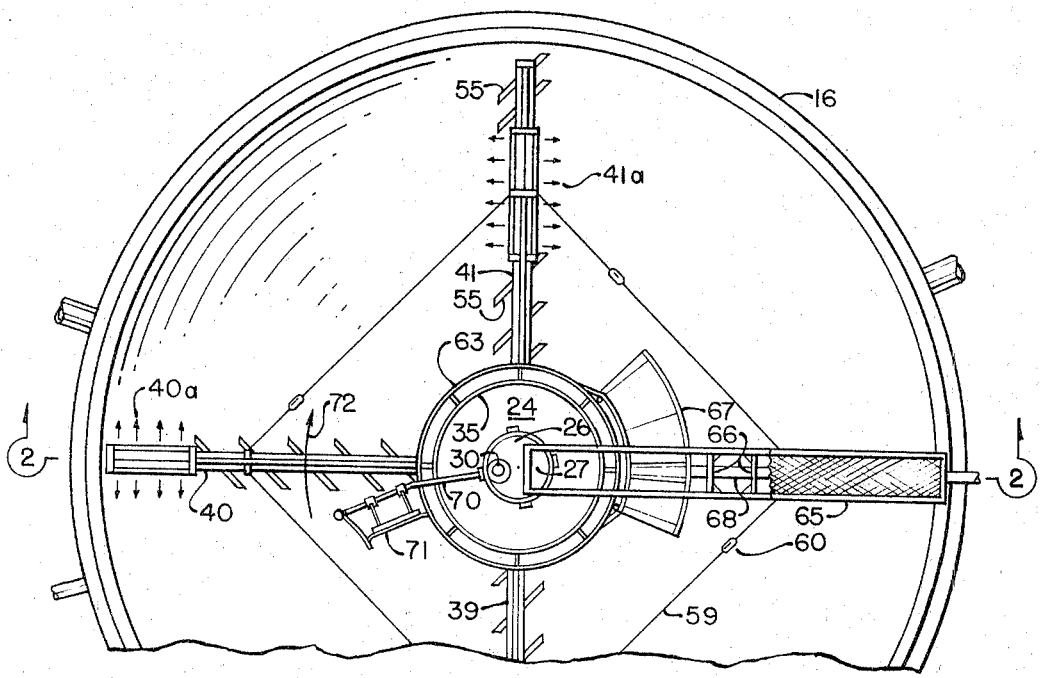

Referring now more particularly to the drawings and especially FIGS. 1 to 7, inclusive, there is illustrated a liquid holding tank 16 of generally circular outline having a side wall 17 and bottom 18 extending inwardly with a flat or downwardly sloping top surface leading to a central cone-shaped sludge receiving well 19. Communicating with the well 19 and leading therefrom is a sludge withdrawal conduit or pipeline 20.

Extending into the lowest part of the tank structure beneath the well 19 is an effluent discharge conduit 21 and rising from the center of the well is a vertical tubular riser column 22 which at its top end is provided with a number of inlet apertures 23 through which effluent flow is directed to the interior of the column from the surrounding effluent overflow launder 24.

The vertical tubular riser column 22 functions as a supporting pier for the rotating flow distributing means about to be described.

Upon the column 22 at the top thereof is mounted a turntable base 25 which supports a ball bearing turntable top 26 which carries an internal ring gear 27.

Mounted in conventional manner above the turntable and ring gear is a combined motor and speed reducer unit which is generally designated 30, the speed reducer being operatively coupled by a driving pinion, not shown, with the ring gear 27.

Attached to the turntable top 26 and suspended therefrom by rigid hangers 31 are drum 32 of the flow distributing means and launder 24 of the effluent overflow means which encircle and are concentric with the riser column and rotate around the central vertical axis of the column.

The top rim of drum 32 terminates in the bottom of launder 24 with hangers 31 projecting therethrough and all fixed together to form a rigid and watertight joint with spaces between the hangers 31 forming flow passages for effluent from launder 24 to enter column apertures 23.

Inserted in the chamber space between fixed riser column 22 and rotating drum 32 and subjacent to launder 24 and apertures 23 is a sealing means 33 to substantially close and divide the chamber into an influent feed portion below and a clarified effluent discharge portion above said sealing means.

Referring now to FIG. 14, there is shown in enlarged scale the sealing means 33 between stationary riser column 22 and rotating drum 32 of the flow distributing means.

On the outside face of riser column 22 and subjacent the bottom of overflow launder 24 and the inlet apertures 23 are a pair of outwardly extending horizontal flanges 22a and 22b with their adjacent faces spaced apart a distance to provide a sliding fit with an annular horizontal and flexible flat sealing means 33 in the manner of a tongue and groove relationship.

On the inside face of drum 32 and positioned directly opposite the said lower flange 22b and with its top face in the same horizontal plane is an outwardly extending horizontal flange 32b with its outer edge concentric with and spaced a working clearance from the outer edge of flange 22b. Fastened to the top of flange 32b is flexible sealing means 33 held in position by solid ring segments 32a and attachment bolts 32c suitably spaced around the ring. Sealing means 33 is commonly made up of two or more layers of rubber belting, or the like, cut in segments for installation or removal and placed in position to form continuous flat rings with the joints formed by the matching ends of one layer covered by the continuous face of an adjacent layer in a manner to seal the joints when the sealing means is subjected to an unbalanced hydraulic pressure from above or below.

Liquid level is established within the holding tank at the line 34 by flow of clarified effluent over horizontal weirs 35 into collecting launder 24 and thence to discharge through apertures 23 into riser column 22 and downward to conduit 21 positioned in the bottom part of the tank structure to discharge away from the tank.

The lower end of drum 32 revolves in a steady bearing and sealing means 36 attached to the top of a stationary cylindrical drum 37 which encircles and is concentric with the riser column and the inside of whose shell forms with the column a chamber to receive the influent feed from an inlet conduit 38 extending into the lower part of the tank structure beneath the well 19 and above effluent discharge conduit 21 and connected with the chamber space inside said drum 37 fixed in the tank structure.

Connected to and radiating from the lower end of the revolving drum 32 are a number of distributing arms each of which is generally designated 39. Four such arms are here illustrated with two long and two short tubular portions here designated 40 and 41 respectively. The inner ends of the arms have open flow connections 42 with the drum shown in FIG. 2 whereby influent flow rising from the chamber space between riser column 22 and drum 37 passes through suitable openings in the bottom of rotating drum 32 and then passes through connections 42 into the arms 39 for radial distribution of the influent in the tank by way of the distributing arms.

The arms 39 are held in fixed vertically spaced relation to the surface of the tank bottom 18 by means of rigid structural bracing 43 which connects the arms, as illustrated, to the drum 32.

While the tubular portions of the distributing arms have been illustrated and described as being of two different lengths, they are otherwise of the same form or construction and accordingly a description of one will be applicable to all.

Upon reference to FIGS. 3 to 7 inclusive, it will be seen that the tubular distributing arm 39 has two sloping top walls 44 and two sloping bottom walls 45 terminating in a vertical plate 46 having an opening therein bounded by the inside faces of the said walls and having a portion thereof extending a distance beyond the top walls 44 and vertically downward laterally of and below walls 45 to define a working clearance 47 with the underlying floor surface 48 of the tank bottom.

Attached to the vertical plate 46 and extending a substantial distance outwardly along the radial axis of distributing arm 39 is a bottomless flow discharge box generally designated 39a having sloping top walls 49 and vertical side walls 50 extending downwardly to out-turned lips or flanges 51 extending in opposite directions from opposite side walls 50 and spaced above the surface 48 of the tank bottom to provide flow passages 52 for the material which is caused to flow outwardly through the arm in opposite directions from the opposite sides thereof.

By provision of the outwardly turned flanges 51 along the upper side of the outflow spaces or passages 52, rounded edges 51a border the passages which prevents the catching of stringy material as such material flows through the passages.

To the outer end of the flow discharge box 39a is secured a solid plate 53 extending a distance outwardly from the walls forming the top and sides of the said box and downwardly to define a working clearance 47 with the underlying floor surface 48 of the tank bottom to cut off the flow from passing radially outward of the flow discharge box.

In operation, solids settleable from the turbid influent enter a quiescent zone overlying the central sludge receiving well 19 and the adjacent floor area of tank bottom 18 which is inside the concentric influent feed area swept by the bottomless flow discharge boxes of the rotating feed distributing means.

Rigidly attached to the underside of flow distributing arms 39 by clip angles 54 are diagonally extending sludge scrapers 55 and attached squeegees 56 with bottom edges set to a working clearance 47 with the underlying floor surface of the tank bottom. Sludge scrapers 55 by pattern of arrangement along the distributing arms 39 are set to collect and deliver settled sludge into sludge receiving well 19. Attached to at least one flow distributing arm overlaying the sludge receiving well are rigid hangers 57 which support a radially extending sludge scraper 58 which parallels the bottom of the well and delivers sludge to the entrance opening of the sludge withdrawal conduit or pipeline 20. Attached to the outer end of short tubular arm 41 is a structural extension carrying sludge scrapers 55 to remove settled solids from that portion of the tank bottom not swept by the scrapers attached to long tubular arm 40.

The two long and two short tubular arms here illustrated, are all of the same design or construction throughout an outer or terminal length thereof, as described and illustrated in FIGS. 3 to 7, whereby the influent feed is discharged over that surface of the tank bottom which is traversed by the outflow passages 52, such that there will be given two complete coverages of the influent feed over the tank bottom with each revolution of the flow distributing apparatus.

Any number of arms and arrangement of the bottomless feed sections leading to the outlet orifices may be used to provide influent flow distribution over the designated feed area.

The flow distributing arms, generally designated 39, are held fixed in a horizontal pattern by the use of tie rods 59 commonly drawn taut by means of turnbuckles 60.

In order to provide outflow passages 52 of substantially constant flow emergence areas as the distributing arms rotate, it is necessary to provide a finished surface to the tank bottom that will fit the plane or cone of rotation of the flow distributing means. In construction, a concrete base 61 is first constructed to approximate shape and grade and after installation and final adjustment of the rotating mechanism, a mortar coat 62 is added and swept into place using screed boards attached to the arms. In this manner, a true fit and working clearance 47 can be obtained between the edge of each part of the rotating mechanism so extended and the underlying floor surface 48.

Figure 2:
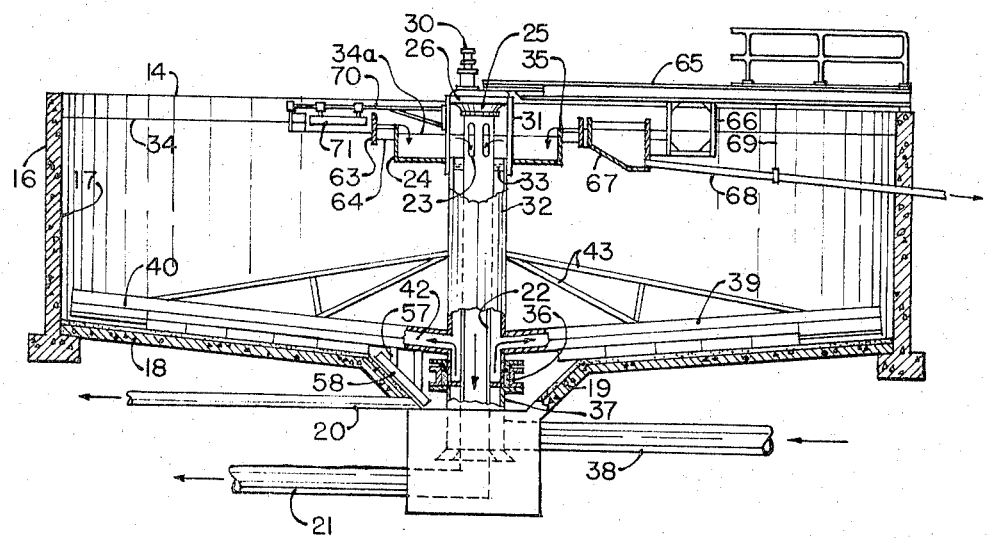
FIG. 2 is a transverse sectional view taken in the vertical plane substantially on the line 2—2 of FIG. 1.

Reference is now made to FIGS. 1 and 2, and to FIGS. 8 to 13 inclusive illustrating the preferred form of liquid clarifying apparatus equipped with a new and improved form of scum skimmer and a liquid holding tank the combination of which as particularly applicable to the clarification of raw sewage and other turbid liquids carrying both settleable and floatable solids.

Referring now more particularly to FIGS. 1 and 2, and the centrally located effluent overflow launder 24, there is shown a vertical scum retaining baffle 63, concentric with and attached to launder 24 by brackets 64, and positioned in front of overflow weir 35 at an elevation to extend above and below the water surface and which in operation will rotate with the launder and influent flow distributing mechanism.

Spanning the space between tank side wall 17 and center column 22 is an operator's bridge 65 fitted in conventional manner and here illustrated with a portion of the walkway and handrailing cut away to show parts of equipment underlying the walkway.

Hung from operator's bridge 65 by rigid structural frame 66 is a stationary scum receiving box which is generally designated 67. Communicating with the scum receiving box 67 leading therefrom is a scum withdrawal conduit or pipeline 68 hung from the overhead bridge by hangers 69.

Attached to one or more rigid hangers 31 of rotating drum 32 is a rigid cantilever bracket 70 carrying a scum skimmer which is generally designated 71 and which with stationary scum receiving box 67 is hereafter further illustrated to an enlarged scale in FIGS. 8 to 13 inclusive.

FIG. 8 is a partial top plan of the centrally located effluent launder 24 with attached scum baffle 63 and adjacent scum collection box 67, the same being on an enlarged scale. As before stated, launder 24 and attached scum baffle 63 are concentric about the central vertical axis of the riser column and are attached to and rotate with the flow distributing mechanism in the direction indicated by arrow 72. Scum receiving box 67 is stationary and held in a fixed position adjacent the rotating scum baffle by a rigid structural frame fixed to the underside of the operator's bridge.

Referring now also to FIGS. 9, 10 and 11, scum collection box 67 consists of two segmental vertical and parallel scum retaining walls 73 and 74 positioned on arcs of circles described by the radii of the outer and inner ends of rotating scum scraper 71 and joined to shelf components which, in the order of direction of rotation 72, consist of a horizontal shelf 75 set at a shallow submergence with water line 34, an inclined shelf 76 set with its crest extending to an elevation above water line 34, a chute 77 with steeply sloping sides and bottom draining to a scum withdrawal pipe 68, a series of diagonal bars 78 to support hinged scum scraper 71 in its passage across the chute and a declining shelf, or ramp 79 to return the hinged scraper to its skimming position with regard to water level 34.

Attached to the ends of inner retaining wall 74 are vertical scum scrapers 80 supported on spring loaded hinges 81 to swing and bear against rotating scum baffle 63.

The rotating scum skimmer generally designated 71, consists of a horizontal scraper blade 82 positioned at the water line 34 with its long axis on a horizontal radius extending through the vertical axis of rotation of the flow distributing means and supported through vertical hinges 83 as the trailing side of a parallelogram formed by supporting side brackets 84 attached through vertical hinges 85 to collar bearings 86 carried by cantilever bracket arm 70 forming the leading side of the parallelogram.

Attached to the outer end of supporting arm 70 through a vertical hinge 87 is a scum retaining baffle 88 held against scraper blade 82 by the tension in coil spring 89 whose ends are attached to baffle 88 and bracket arm 70.

In operation, scum scraper blade 82 being the trailing side of a vertically hinged parallelogram, is free to shift in and out along its aforesaid horizontal radius, and, through the pull of tension spring 89 on hinged scum retaining baffle 88 is held against scum baffle 63 and follows the guidance of scum scrapers 80 and vertical wall 74 of scum collection box 67 as the flow distributing apparatus rotates. Scraper blade 82 is fitted on the ends and bottom with flexible wiper 90 to substantially seal the scraper against side walls 73 and 74 and bottom shelves 75, 76, and 79 of the scum receiving box as skimmer 71 rotates. By such means, scum pushed into the liquid space above the shelves is trapped and pushed over the crest of inclined shelf 76 and dumped into chute 77 for withdrawal by conduit or pipeline 68. Hinged baffle 88 is positioned by its supporting hinge 87 to pass on the outside of scum box 67 and to engage the entrance end of scum retaining wall 73 to scrape its outside face free of scum as the skimmer rotates.

In the preferred form of rotating feed distributing apparatus, turbid liquid is continuously and evenly distributed as a thin sheet over a substantial bottom feed area of the outer portion of the holding tank by controlled mechanical and hydraulic means. The number and cross sectional flow areas of distributing arms 39, and the position and lengths of their respective bottomless flow discharge boxes 39a with outflow passages 52 are selected to give relatively low flow velocities and to distribute the influent feed in a unit of quantity per unit of bottom feed area substantially without overlap or omission between the concentric bottom areas passed over by adjacent arm flow passages and together to cover the whole bottom feed area.

In practical application, treating raw sewage for example, variable flow velocities through the distributing arms 39 may be in the order of, but not limited to, 0.5 to 2.0 feet per second without danger of stranding settleable solids along the invert of the arms since turbid influent is delivered at the terminal lengths of the tubular arms into bottomless flow discharge boxes 39a having oppositely directed outflow passages 52 which are self cleaning as the arms rotate. The area of tank bottom selected to receive influent feed may be in the order of, but not limited to, 25 to 75 percent of the liquid area within the tank. The hydraulic energy contained in the feed at discharge will thus be distributed over a substantial area of the tank bottom to rise and mix and be dissipated into the overlaying liquid. Introduction of influent over such a proportionately large bottom feed area will cause the overlaying liquid to rise by displacement into the upper clarification zone carrying the floatable solids contained in the feed to the overlaying free liquid surface.

Since the flow pattern within the tank provides for removing clarified effluent at the tank center, there gradually develops a general turning movement to the free flowing mass of liquid in the direction of the centrally located effluent overflow launder 24. Free floating solids and scum are buoyed up on the liquid surface and transported radially inward by surface flow to contact scum baffle 63 where they are retained while the clarified effluent passes underneath the scum baffle and over horizontal weirs 35, into collecting launder 24 and thence to discharge through apertures 23 into riser column 22 and downward to the effluent discharge conduit 21. Floating solids and scum accumulate in front of scum baffle 63 where it is slowly gathered by rotating scum skimmer 71 and delivered to stationary scum receiving box 67. Here it is pushed and trapped into the liquid space above shelf 75 between side walls 73 and 74 by scraper blade 82 and thence over the crest of inclined shelf 76 into chute 77 for withdrawal by conduit or pipeline 68.

Reference is now made to FIG. 1 showing a partial top plan of the preferred form of apparatus and liquid holding tank with means for distributing the influent over a bottom feed area adjacent the periphery and to FIG. 6. The general direction of discharge of influent feed through outflow passages 52 is normal to the long axis of the rotating flow distributing arms and is here indicated by arrows 40a for the two long arms and 41a for the two short arms. Since all the hydraulic energy contained in the influent feed will not be dissipated at discharge, a portion of the flow released from the outer ends of flow discharge boxes 39a forming a part of the long distributing arms will be intercepted by tank side wall 17 and follow along the inside surface of that wall in a diagonally rising direction until it reaches the liquid surface. The velocity head remaining within that portion of the influent feed rising against the wall will cause it to turn inward towards the centrally located overflow launder thus clearing the liquid surface adjacent the wall of floating solids and scum.

Reference is now made to the feed distributing means shown in FIG. 6, wherein a split feed is used for discharging the influent through outflow passages 52 formed in the advancing and trailing sides of rotating flow discharge box 39a. The flushing action of the turbulent feed combined with the rotation of the flow distributing means provides agitation sufficient to maintain flocculent solids of low specific gravity in teetering suspension within the lower portion of the feed distributing zone while the general radial movement inward of the liquid within the tank transports those solids for sedimentation in the quiescent settling zone in the central portion of the tank.

For liquids carrying solids that settle and cannot be readily flushed into suspension in the liquid overlaying the feed area of the tank bottom, a staggered system of feed boxes 39a, and sludge scrapers 55, can be used and arranged so that the whole bottom area selected for feed can be uniformly covered by the influent feed and the same area also scraped by the sludge scrapers to move settled solids and sludge to the central sludge receiving well 19. The use of feed boxes and sludge scrapers to cover for their respective purposes the whole bottom area selected for distributing the influent feed combined with the scum collection and removal system described herein, permits the apparatus to be used for the treatment of all kinds of liquids carrying settleable and floatable fine solids in suspension without regard to their specific gravity and settling characteristics.

In the preferred form of apparatus and liquid holding tank described herein, a centrally located effluent launder 24 with effluent overflow weir 35 is used to establish water level 34 and overflow clarified effluent for discharge through inlet apertures 23, riser column 22 and discharge conduit 21. For collecting and removing scum accumulated in front of scum baffle 63, it is immaterial how effluent is removed from behind the intercepting scum baffle so long as liquid level 34 is maintained and the variation in liquid levels remain between the limits of the top surface of horizontal scum shelf 75 and the crest of inclined shelf 76 of scum collection box 67. Effluent launder 24 with overflow weir 35 can be eliminated if the effluent in discharge conduit 21 is delivered to an adjacent water level control box or tank, having means for supporting liquid level 34 in holding tank 16 at an elevation between the top surface of scum shelf 75 and the crest of inclined shelf 76. In this case, rotating scum baffle 63 could be supported on cantilever brackets, similar to bracket 70, attached to rigid hangers 31 hung from turntable top 26 of the rotating mechanism. Clarified top liquor would pass underneath the scum baffle through inlet apertures 23, riser column 22 and discharge conduit 21 to the adjacent water level control and final discharge box. Floating solids and scum accumulated in front of intercepting scum baffle 63 would be collected by rotating skimmer 71 and delivered into scum receiving box 67 for discharge from the tank as previously described.

Effluent overflow means with or without launder 24 can also be used in combination with a stationary scum retaining baffle 63. In this case, baffle supporting brackets 64, or cantilever brackets attached to rigid hangers 31, as the case may be are eliminated and stationary baffle 63 is supported from brackets attached to operator's bridge 65, an extension of the bridge across the supporting center pier a distance greater than the radial length of skimmer supporting arm 70, and from structural cantilever radial brackets positioned in the plane of and supported by operator's bridge 65, and with all brackets having rigid structural hangers for attachment to and support of scum baffle 63 in a manner analogous to rigid structural frame 66 used to support scum receiving box 67.

In this case segmental scum retaining wall 74, vertical scum scrapers 80 and their spring loaded supporting hinges 81 are eliminated and the position of scum receiving box 67 is moved radially inward a distance to place stationary baffle 63 in the former position of scum retaining wall 74. The inboard ends of shelves 75, 76 and 79 and scum chute 77 are now fixedly attached to scum baffle 63. In operation, rotating scum skimmer 71 with its horizontal scraper blade 82 now scrapes the face of stationary scum baffle 63 around its entire periphery to collect floating solids and scum accumulated in front of the said scum intercepting baffle and deliver it to scum receiving box 67 for discharge from the tank through scum discharge line 68.

In the new and improved combination means for distributing, collecting and removing settleable solids in the form of sludge and floatable solids in the form of scum by controlled hydraulic and mechanical means, it is an object of my invention to utilize the flow pattern of peripheral bottom feed-central surface overflow and to provide new and improved scum collection and removal apparatus for the efficient collection and removal of the floatable solids and scum contained in all the kinds of liquids that may be presented for clarification. The new and improved centrally located scum collection and removal apparatus is employed in conjunction with liquid clarifying apparatus having a rotating feed distributing means and wherein the feed distributing means may be of unique construction to discharge influent from the advancing and trailing sides of the distributing arm means.

From the foregoing it will be seen that there is provided by the present invention a new and novel form or construction of floatable solids and scum collection and removal means for operation in combination with peripheral feed-center overflow liquid clarifying apparatus which will be recognized by those versed in the art as embodying many features of advantage over the types of scum collection and removal means used in combination with the center feed-peripheral overflow liquid clarifying apparatus.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. Liquid clarifying apparatus comprising a liquid holding tank including a bottom wall, effluent discharge means including a central effluent overflow launder supported at the central upper portion of the tank for removing clarified liquid from the tank, flow distributing means disposed at the lower central portion of the tank and including distributing arm means of tubular construction, influent conduit means connected with said distributing arm means for feeding influent turbid liquid thereinto, said distributing arm means including flow discharge means disposed at a position spaced a substantial distance radially outwardly of the central portion of the tank for feeding turbid liquid into the tank along the bottom wall portion thereof, at positions spaced outwardly of the central portion of the tank and near the periphery of the bottom wall of the tank, and scum removal means, said scum removal means including a scum retaining baffle disposed concentric to the effluent overflow launder and outwardly thereof and disposed so as to be normally positioned at an elevation to extend above and below the liquid surface as determined by the overflow launder, a scum receiving means disposed adjacent said scum retaining baffle, scum skimmer means including a blade means, means connected with said skimmer means for normally rotating the skimmer means during operation of the apparatus, said scum receiving means being stationary, and said scum skimmer means moving into operative relationship with respect to said scum receiving means for forcing scum adjacent said scum retaining baffle into operative relationship with respect to said scum receiving means.

2. Apparatus as defined in claim 1 wherein said scum receiving means includes a box and a chute portion having a scum removal conduit connected therewith, said scum receiving box having a shelf portion disposed on the advancing side of said chute portion for receiving and trapping scum with said skimmer blade.

3. Apparatus as defined in claim 2 wherein said shelf portion includes a first shelf portion disposed below the normal liquid level within the tank, said first shelf portion joining with a second inclined shelf portion having a crest area disposed above the normal liquid level within the tank, said chute portion being disposed adjacent said crest portion, means disposed over said chute portion for supporting the skimmer blade in its movement thereover, and a declining skimmer blade support means disposed at the other side of said chute portion and having a crest portion above the normal liquid level and extending downwardly to a point below the normal liquid level in the tank.

4. In liquid clarifying apparatus, a liquid holding tank, said liquid holding tank including effluent discharge means supported at the central upper portion of the tank for removing clarified liquid from the tank, flow distributing means disposed in the lower portion of the tank for distributing influent turbid liquid adjacent the periphery of the tank, and scum removal means disposed at the upper central portion of the tank adjacent said effluent discharge means, said scum removal means including a scum retaining baffle disposed in surrounding concentric relationship to said effluent discharge means, a stationary scum receiving box disposed adjacent said scum retaining baffle, said scum receiving box including a chute portion disposed at an intermediate part thereof, a scum withdrawal conduit connected with said chute portion for withdrawing scum therefrom, said scum receiving box including shelf portions disposed at the scum entrance side of said chute portion, support members disposed at the upper part of said chute portion for supporting a member for movement thereover, scum skimmer means including a blade means, means for moving said blade means with respect to said scum receiving box with said blade means being movable over said shelf portions and the support members at the upper portion of said chute portion to force scum onto said scum receiving box and into said chute portion for removal from the apparatus, means mounting said skimmer means for movement relative to said scum retaining baffle and said scum receiving box to enable the skimmer means blade to engage the scum retaining baffle and portions of the scum receiving box, and resilient means producing a force on said skimmer blade means to urge it into proper operative relationship.

5. Apparatus as defined in claim 4 including scum scraper means pivotally connected with said scum receiving box and engaging the outer surface of said scum retaining baffle to remove scum from the outer surface of the scum retaining baffle.

6. Liquid clarifying apparatus including a liquid holding tank having a side wall and a bottom wall, said bottom wall having a centrally located sludge receiving well, means for withdrawing sludge from said well, effluent discharge means disposed in the central portion of said tank and including a central effluent overflow launder disposed at the upper portion of the tank for removing clarified liquid from the upper central portion of the tank, flow distributing means disposed within the tank and including a plurality of elongated tubular radially extending distributing arms, means for normally moving said arms along the bottom of the tank in adjacent spaced relationship thereto during operation of the apparatus, influent conduit means operatively connected with each of said distributing arms for feeding turbid liquid thereinto, each of said distributing arms including flow discharge means, said flow discharge means of each distributing arm being disposed at a position disposed radially outwardly of the central portion of the tank, each of said flow discharge means being bottomless and defining with the bottom of the tank a pair of flow passages one of which is adapted to discharge influent liquid from the advancing side of the distributing arm and the other of which is adapted to discharge influent liquid from the trailing side of the distributing arm, at least two of said distributing arms having sludge scraper means connected therewith and depending therefrom into spaced adjacent relationship with the bottom of the tank, some of said sludge scrapers being disposed at an oblique angle to the associated flow distributing arms so as to move sludge from the bottom wall of the tank to the central well, and scum removal means including a scum retaining baffle disposed in surrounding concentric relationship with said overflow launder and spaced therefrom, a scum receiving box disposed adjacent to and outwardly of said scum retaining baffle, said scum receiving box including a chute portion for receiving scum, a scum removal conduit connected with said chute portion for withdrawing scum from the chute portion, scum skimmer means including a blade portion, means for normally moving said scum skimmer means with respect to said scum receiving box so as to force scum collected by said scum retaining baffle onto said scum receiving box and into said chute portion, and means for mounting said skimmer blade means for movement relative to said scum retaining baffle and said scum receiving box so as to engage the scum retaining baffle and scum receiving box during operation of the apparatus.

7. Apparatus as defined in claim 6 including sludge scraper means connected with at least one of said distributing arms and disposed within said well for moving sludge from the well to said sludge withdrawal means connected with the well.

8. Apparatus as defined in claim 6 wherein said scum receiving box includes a first shelf portion disposed below the normal liquid level of the tank as determined by the overflow launder, said first shelf portion joining with a second inclined shelf portion having a crest portion disposed above the normal liquid level within the tank, said crest portion being disposed adjacent said chute portion, said scum receiving box including a third shelf portion having a crest portion disposed adjacent the opposite side of said chute portion, said third shelf portion declining to a point below the normal liquid level within the tank, and said chute portion having support means disposed thereover for supporting the skimmer blade means in its movement over the chute portion.

9. Apparatus as defined in claim 6 including other members pivotally connected with said skimmer blade to form a member of a parallelogram, and resiliently biased means engaging one end portion of said skimmer blade means for normally moving the skimmer blade means into its operative position and further to retain scum in position relative to the face of the skimmer blade means and preventing such scum from moving radially outwardly therefrom.

10. Liquid clarifying apparatus comprising a liquid holding tank including a bottom wall and a side wall, effluent discharge means including a central overflow launder supported at the central upper portion of the tank for removing clarified liquid from the tank, flow distributing means disposed adjacent the side wall of the tank for feeding influent turbid liquid thereinto, and scum removal means, said scum removal means including a scum retaining baffle disposed concentric to the overflow launder and outwardly thereof and disposed so as to be normally positioned at an elevation to extend above and below the liquid surface as determined by the overflow launder, a scum receiving means disposed adjacent said scum retaining baffle, scum skimmer means including a blade means, means connected wtih said skimmer means for normally rotating the skimmer means during operation of the apparatus, said scum receiving means being stationary, and said scum skimmer means moving into operative relationship with respect to said scum receiving means for forcing scum adjacent said scum retaining baffle into operative relationship with respect to said scum receiving means.

11. Liquid clarifying apparatus comprising a liquid holding tank including a bottom wall and a side wall, effluent discharge means disposed at the central upper portion of the tank for removing clarified liquid from the tank, means maintaining a predetermined liquid level in the tank, flow distributing means disposed adjacent the side wall of the tank for feeding influent turbid liquid thereinto, and scum removal means, said scum removal means including a scum retaining baffle positioned outwardly of and in surrounding relationship to the effluent discharge means and spaced a substantial distance inwardly of said side wall, said baffle being at an elevation to extend above and below the normal operating liquid surface within the tank, scum receiving means disposed outwardly of said scum retaining baffle, and scum collecting means disposed adjacent said scum retaining baffle for collecting scum adjacent the outer surface of said retaining baffle and conveying the scum to said scum receiving means.

12. Liquid clarifying apparatus comprising a liquid holding tank including a bottom wall and a side wall, effluent discharge means including a central hollow riser column having inlets at the top portion thereof, the lower portion of said riser column being connected with an outlet conduit having effluent overflow means for withdrawing clarified liquid and fixing the normal liquid level within the tank, flow distributing means disposed adjacent the side wall of the tank for feeding influent turbid liquid thereinto, and scum removal means, said scum removal means including a scum retaining baffle disposed concentric to the riser column and outwardly thereof and disposed so as to be normally positioned at an elevation to extend above and below the liquid surface as determined by the outlet conduit overflow means, a scum receiving means disposed adjacent said scum retainnig baffle, scum skimmer means including a blade means, means connected with said skimmer means for normally rotating the skimmer means during operation of the apparatus, said scum receiving means being stationary, and said scum skimmer means moving into operative relationship with respect to said scum receiving means for forcing scum adjacent said scum retaining baffle into operative relationship with respect to said scum receiving means.

13. Liquid clarifying apparatus comprising a liquid holding tank including a bottom wall and a side wall, effluent discharge means including a central hollow riser column having inlets at the top portion thereof, the lower portion of said riser column being connected with an outlet conduit having effluent overflow means for withdrawing clarified liquid and fixing the normal liquid level within the tank, flow distributing means disposed adjacent the side wall of the tank for feeding influent turbid liquid thereinto, and scum removal means, said scum removal means including a scum retaining baffle positioned outwardly of and in surrounding relationship to the effluent discharge means and spaced a substantial distance inwardly of said side wall, said baffle being positioned at an elevation to extend above and below the normal liquid level within the tank as determined by the outlet conduit overflow means, a scum receiving means disposed outwardly of said scum retaining baffle, and scum collecting means disposed adjacent said scum retaining baffle for collecting scum adjacent the outer surface of said retaining baffle and conveying the scum to said scum receiving means.

References Cited by the Examiner

UNITED STATES PATENTS

| | | | |
|---|---|---|---|
| 2,263,167 | 11/1941 | Dorr et al. | 210—520 |
| 2,263,168 | 11/1941 | Dorr et al. | 210—520 |
| 2,417,688 | 3/1947 | Jeffery | 210—525 X |
| 2,611,489 | 9/1952 | Scott | 210—528 |
| 2,876,863 | 3/1959 | Kivari | 210—525 X |
| 3,025,966 | 3/1962 | Kivell | 210—530 |

REUBEN FRIEDMAN, *Primary Examiner.*

J. DECESARE, *Assistant Examiner.*